United States Patent [19]

Abrams et al.

[11] 4,436,635

[45] Mar. 13, 1984

[54] PROCESS FOR FILTRATION OF OIL AND GAS WELL TREATMENT FLUIDS

[75] Inventors: Howard Abrams, Plainview; Barrington T. Allen, Bayville, both of N.Y.

[73] Assignee: Pall Corporation, Glen Cove, N.Y.

[21] Appl. No.: 405,938

[22] Filed: Aug. 6, 1982

Related U.S. Application Data

[63] Continuation-in-part of Ser. No. 305,070, Sep. 24, 1981, abandoned.

[51] Int. Cl.³ .............................................. B01D 27/06
[52] U.S. Cl. .................................................... 210/806
[58] Field of Search .............. 210/777, 708, 799, 806, 210/323.2, 493.5, 767; 166/267

[56] References Cited

U.S. PATENT DOCUMENTS

| | | | |
|---|---|---|---|
| 2,919,898 | 1/1960 | Marwil et al. | 255/1.8 |
| 3,347,391 | 10/1967 | Steensen | 210/491 |
| 4,033,881 | 7/1977 | Pall | 210/491 |
| 4,175,039 | 11/1979 | Fisher | 210/74 |
| 4,212,748 | 7/1980 | Ferrell et al. | 252/8.55 |

OTHER PUBLICATIONS

Olivier, "Improved Completion Practices Yield High Productivity Wells," *Petroleum Engineer International*, Apr. 1981, pp. 23-28.

*Primary Examiner*—Thomas G. Wyse
*Attorney, Agent, or Firm*—Leydig, Voit, Osann, Mayer and Holt, Ltd.

[57] ABSTRACT

A filtering process is disclosed for obtaining a clear effluent filtrate from a turbid oil or gas well treatment fluid contaminated with solid particulates comprised of drilling and formation debris having particle sizes in the range of from about 0.1 to about 30 micrometers comprising passing the treatment fluid through a surface filter having an absolute pore rating of about 40 micrometers or less at a flow density of from about 0.05 to about 0.5 gallons per minute per square foot of filter surface such that (1) initially at least a portion of the particulates is collected on the upstream surface of the surface filter and begins forming a filter cake with enhanced capability for removing particulates smaller than the absolute pore rating of said surface filter and (2) thereafter the treatment fluid is filtered through a filter composite of the surface filter and the filter cake whereby a clear effluent substantially free of solid particulates having particle sizes in the range of from about 0.1 to about 30 micrometers or higher is obtained and the useful life of the surface filter is extended.

The process has particular application to the treatment of completion and stimulation fluids used in oil and gas wells.

20 Claims, 3 Drawing Figures

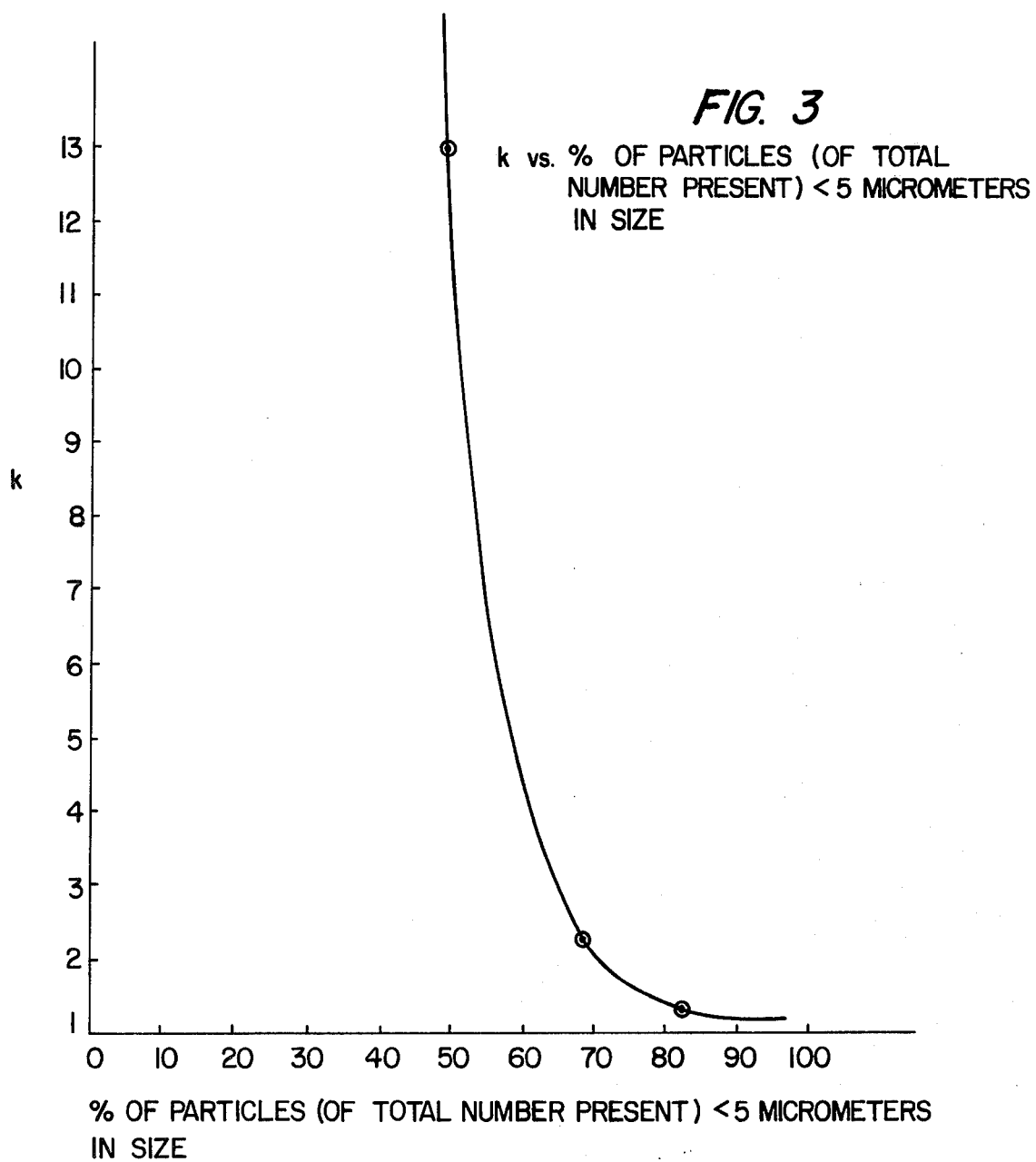

PROCESS FOR FILTRATION OF OIL AND GAS WELL TREATMENT FLUIDS

This application is a continuation-in-part application of U.S. Ser. No. 305,070, filed Sept. 24, 1981, entitled "Process And Apparatus For Filtration Of Less Than 30 Micrometer Particles From Oil And Gas Well Completion And Stimulation Fluids", now abandoned.

TECHNICAL FIELD

The present invention relates to a process for filtering oil and gas well treatment fluids, such as completion and stimulation fluids. More particularly, this invention relates to a novel process for obtaining a clear effluent from a turbid oil or gas well treatment fluid contaminated with solid particulates having particle sizes in the range of from about 0.1 to about 30 micrometers.

BACKGROUND ART

Oil and gas producing formations occur as microporous strata and the production rate for flow of oil or gas into a well bore depends on available pressure differentials in the stratum and the stratum's permeability or porosity. After a bore hole has been drilled to or through an oil or gas producing stratum, it must, in order to become a reliably producing well, be subjected to a completion operation. This operation insures that the oil or gas, through the useful life of the well, is able to flow freely into the well bore and reach the surface.

Such operations vary substantially in basic type and detail, depending on a number of factors including the type of stratum being tapped, e.g., unconsolidated sand, sandstone or porous limestone.

One type of completion operation is that referred to as an open hole completion. In this procedure, an iron-cased and cemented bore hole is dug to the top of the stratum, after which penetration into the stratum is achieved by underreaming, that is, drilling an oversized hole below the lined bore hole into and through the producing stratum. This large diameter open hole is then stabilized by packing it with gravel around a slotted screen at the center of the open hole. The slotted screen is connected to the cased bore hole. Oil or gas flow is then permitted or induced from the stratum into the gravel pack, and then to and through the well bore.

A second type of completion operation involves drilling the bore hole through the stratum, after which it is cased and cemented. Access to the producing stratum from the well bore is then achieved by perforating the casing cement wall by means of shaped charges. The perforation holes may then be gravel packed if, for example, the formation is an unconsolidated sand.

In these and most other well completion operations, a hydrostatic balance is maintained in the well to prevent oil or gas flow from the formation until desired by using a fluid column usually comprised of a water-based brine composition of appropriate density in the well bore. This fluid also serves to clean contaminants from previous operations, e.g., drilling mud from the well bore, and to transfer gravel to the well bore. During these completion operations, the completion fluid becomes laden with a wide variety of suspended solid particulates comprised of drilling and formation debris, such as gravel, sand, ground up rock from the drilling operation and clay particulates, particularly bentonite, from the drilling mud. These particulates typically range in size from gravel, i.e., small rocks, down to submicronic particles of 0.1 micrometer in size or even smaller. Those of about 0.1 micrometer to about 30 micrometers in size pose a particular threat to the permeability of the producing formation, especially adjacent the well bore, such as at an open hole surface or at the perforations referred to above.

The reason for this is that, when the completion fluid penetrates into the formation as it does under conditions of well bore over-pressure, it carries with it those particles small enough to enter the formation pores and these particles are then deposited in these pores, plugging the formation. Specific operations, such as the perforation wash, in which completion fluid is jetted through the perforations into an unconsolidated sand formation to clean the formation, is an extreme example of where even a low level of small particulate contamination in a completion fluid can severly reduce the formation permeability in its most critical region, that is immediately adjacent the well bore.

Two strategies are commonly used to avoid such formation damage. One is to use only exceptionally clean (i.e, particle-free) fluids, where, in practice, an upper size limit for particles present in the completion fluid is, for example, 1 micrometer. Another is to have a well-controlled dispersion of particles that, in the initial stage of the completion operation, will jam and form an impermeable but removable cake on the stratum surface at the well bore, thereby preventing entry into the stratum of both fluid and suspended particles during the completion operation. This cake is then removed by use of an acid or the like when the completion operation is completed and the well is ready to be brought on stream.

Both these strategies involve the ability to completely remove contaminant particles of greater than, for example, 1 micrometer in size from a completion fluid prior to its injection into the well. This is difficult and made more so in those completion operations where the fluid is recirculated many times through the well, emerging each time with an added contaminant load.

In such an operation, it may be necessary to remove dirt loadings of up to 10 percent by weight from the completion fluid, much of this, however, being of such a size as to be removable by conventional on-line processes, such as screening or centrifuging. For particulates smaller than 30 micrometers, however, such devices are ineffective and will leave solid particulates of between 0.1 and 30 micrometers in the completion fluid at levels that may reach 10,000 parts per million of solids on a weight basis (hereinafter "ppm"). Within this particle size range, i.e., from 0.1 to 30 micrometers, are precisely those particles which are most capable of invading the pores of a typical oil or gas bearing stratum and significantly reducing its permeability.

Reduction of stratum permeability leads to significant losses in well productivity. Indeed, many wells, upon completion, show little production. The wells must then be subjected to recompletion, in hopes of a better job, or stimulation by acidizing or fracturing at the cost of increased expense and additional down time. Similarly, productivity profiles of producing wells decline over time. When productivity reaches a certain minimal value, remedial rework (acidizing, fracturing or recompletion) must be attempted. Wells completed with a high quality (clean) fluid not only show a higher initial productivity, they also have a slower decline in production profiles, hence lengthening the time intervals between remedial workover.

Substantially complete removal of solid particulates in the particle size range of from about 1 to about 30 micrometers has not previously been economically feasible using available cartridge filtration technology. Cartridge filtration practice as applied prior to the subject invention, primarily using depthtype filters, typically cylinders with a hollow core with walls of about three-quarters of an inch in thickness and made of wound or randomly laid fibers, such as polypropylene and fiberglass, only resulted in a reduction of the contaminant loading of particles. To achieve even moderate levels of clarity, e.g., 80 ppm in the effluent from an influent loading of 2,000 ppm, would require a number of passes through the filter system using previously available depth filter technology. Substantially complete removal of particles above 0.1 micrometer was not a realizable goal with prior art filtration technology, thus not permitting the desired control of solids in a recycled completion fluid, as required by the two strategies discussed above.

Because of the high loading in the influent treatment fluid, conventional cartridge filters using pleated filter elements operating at conventional flow rates, e.g., from 1 to 4 gallons per minute per square foot of filter surface, quickly became clogged and developed unacceptable pressure drops, rendering them economically unsatisfactory. The cost of such filters, compared with depth filters, and their short life when operated at conventional flow rates, leading to excessive downtime for changeout, has substantially precluded their use in the oil industry for filtering recirculating oil and gas well treatment fluids.

This invention, then, is directed to a filtering process for obtaining a clear effluent filtrate from a turbid oil or gas well treatment fluid contaminated with solid particulates comprised of drilling and formation debris having particle sizes in the range of from about 0.1 to about 30 micrometers and where the effluent filtrate is substantially free of solid particulates having particle sizes in the range of from about 0.1 to about 30 micrometers.

DISCLOSURE OF THE INVENTION

The subject invention is directed to a filtering process for obtaining a clear, effluent filtrate from a turbid oil or gas well treatment fluid contaminated with solid particulates comprised of drilling and formation debris having particle sizes in the range of from about 0.1 to about 30 micrometers comprising passing the treatment fluid through a surface filter having an absolute pore rating of about 40 micrometers or less at a flow density of from about 0.05 to about 0.5 gallons per minute per square foot of filter surface whereby (1) initially at least a portion of the particulates are collected on the upstream surface of the surface filter and begin forming a filter cake with enhanced capability—relative to the surface filter—for removing particulates smaller than the absolute pore rating of the surface filter, and (2) thereafter the turbid oil or gas well treatment fluid contaminated with the solid particulates is filtered through the filter composite of the surface filter and the filter cake whereby a clear effluent substantially free of particulates having particle sizes in the range of from about 0.1 to about 30 micrometers or higher is obtained and the useful life of the surface filter is extended.

The process of the subject invention leads to extended filter life, substantially cleaner oil or gas well treatment fluids than previously have been obtained by conventional technology and the concomitant improved economy in treatment costs for oil or gas well completion operations, stimulation and workover operations.

Preferably, the process of the subject invention is carried out at flow rates in the range of from about 0.05 to about 0.3 gallons per minute per square foot of filter surface using a plurality of filter cartridges comprised of pleated filter sheet material in tubular form encased in a conventional rigid cartridge support comprised of an internal porous core, a porous external sheath and end caps. Typically, a visually clear effluent is obtained by the process of the subject invention with an extended filter life, as compared with conventional cartridge filtration systems, e.g., by this invention a useful filter life of over one hour with a visually clear effluent substantially free of solid particulates having particle sizes in the range of from 0.1 to 30 micrometers or larger is obtained, as compared to a useful life in conventional filtration systems, using depth filter cartridges, that can be as short as ten minutes or less with effluent loadings of 20 to 30 percent of the influent loading, when operating at comparable influent loadings of, for example, 1,000 ppm.

BRIEF DESCRIPTION OF THE DRAWINGS

FIG. 3 is a plot of k values versus percent of particles (of total number present) smaller than 5 micrometers in size for a disc surface filter element having an absolute particle rating of 2 micrometers.

BEST MODE FOR CARRYING OUT THE INVENTION

Figure 1:
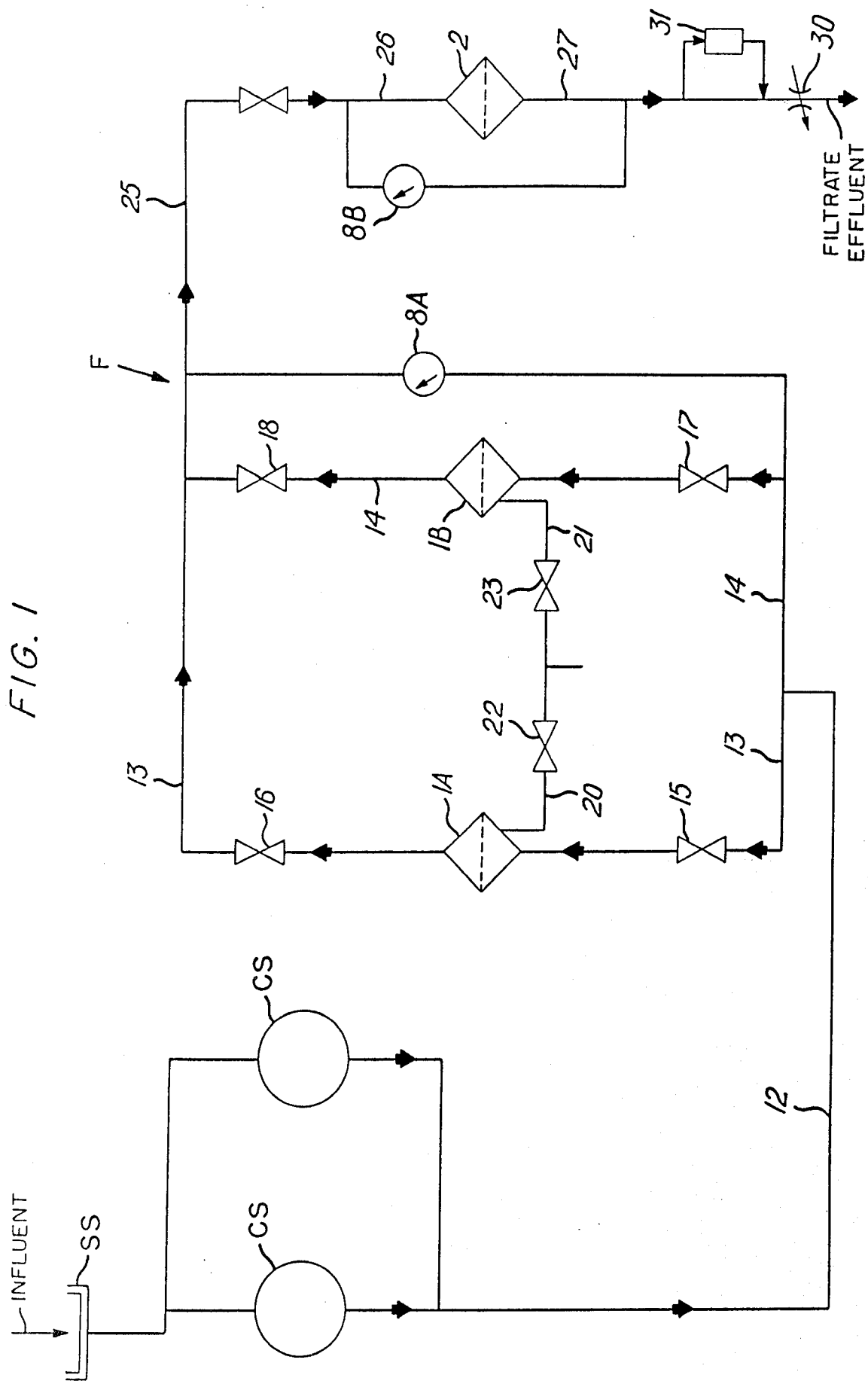
FIG. 1 is a flow sheet showing in schematic form a treatment system useful for practicing the process of the subject invention and the flow path of the oil or gas well treatment fluid as it is filtered using the process of the subject invention. The treatment system shown includes the following equipment: a shaker screen and a centrifugal separator, i.e., coarse particle removal equipment, as well as a filter system comprised of two filter stages, i.e., a prefilter stage and a final filter stage.

In accordance with the subject invention, a filter process is provided for obtaining a clear effluent filtrate from a turbid oil or gas well treatment fluid contaminated with solid particulates comprised of drilling and formation debris having particle sizes in the range of from about 0.1 to about 30 micrometers. The clear effluent filtrate obtained by the process of the subject invention is substantially free of solid particulates having particle sizes in the range of from about 0.1 to about 30 micrometers, as well as any larger particles. By "substantially free" is meant that there is no more than about 5 ppm of solid particulates in the specified size range. Preferably, there will be no more than about 2 ppm or less, more preferably no more than about 1 ppm and there may be as little as about 0.1 ppm or less or even about 0.01 ppm or less of solid particulates of from about 0.1 to about 30 micrometers or higher present in the effluent filtrate.

Not only is the process of the subject invention capable of providing a visually clear effluent filtrate substantially free of solid particulates in the range of from about 0.1 to about 30 micrometers from a turbid oil or gas well treatment fluid contaminated with solid particulates comprised of drilling and formation debris having particle sizes in the range of from about 0.1 to about 30 micrometers, the process of the subject invention is capable of producing this visually clear effluent in one filter stage without the use of prefilters, while at the same time providing an extended filter life as compared to conventional cartridge filtration systems. Alternatively, of course, two or more filter stages may be used and, indeed, may be desirable for some applications where a visually clear effluent is needed from the initiation of the filtering process.

It should be noted that the term "oil or gas well treatment fluid" as used herein includes completion fluids, stimulation fluids, workover fluids, drilling fluids of the brine type (but not including conventional drilling muds with very high loadings of clay particles) and any other treatment fluid used in an oil or gas well operation which contains solid particulates comprised of drilling and formation debris, such as bentonite, having particle sizes in the range of from about 0.1 to about 30 micrometers. The process of this invention is most effective with oil or gas well treatment fluids having loadings up to about 2,000 ppm. When particle loadings of particles in the range of from about 0.1 to about 30 micrometers exceed about 2,000 ppm, other treatment processes, such as treatment with a flocculating agent or settling, may be necessary to reduce the loading to the range of about 2,000 ppm or less most expeditiously treated by the process of this invention.

The term "drilling and formation debris" comprises solid particulates having particle sizes in the range of from about 0.1 to about 30 micrometers and may include sand, ground up rock from the drilling operation, residual clay particulates from the drilling mud, combinations thereof, etc. While the treatment may contain solid particulates larger than 30 micrometers, these larger particles are most efficaciously removed upstream of the filtering system of the subject invention by conventional technology, including shaker screens and centrifuges.

It should also be understood that the term "filter" as used herein refers to the medium used to remove solid particulates from the oil or gas well treatment fluid in a given stage of the filter system. For example, if a two stage filter system is used with a prefilter and a final filter, the prefilter may be comprised on one or more filter cartridges, each comprised of a pleated tubular surface filter disposed as a filter array in a housing, as shown in copending U.S. Ser. No. 406,095, filed Aug. 6, 1982, in the names of Miller and Reed, the disclosure of which is incorporated herein by reference, now U.S. Pat. No. 4,419,234. Similarly, the final filter may be comprised of one or more filter cartridges disposed as a filter array in a housing. In both cases, the term "filter" as used herein in context refers to the filter medium in the given stage.

With that background, the process of the subject invention comprises passing the turbid oil or gas well treatment fluid through a surface filter having an absolute pore rating of about 40 micrometers or less, i.e., from about 0.1 to about 40 micrometers, preferably from about 0.5 to about 30 micrometers, more preferably from about 5 to about 15 micrometers, at a flow density of from about 0.05 to about 0.5 gallons per minute per square foot of filter surface such that (1) initially at least a portion of the solid particulates is collected on the upstream surface of the surface filter and begins forming a filter cake with enhanced capability for removing particulates smaller than the absolute pore rating of the surface filter and (2) thereafter the treatment fluid is filtered through a filter composite of (i) the surface filter and (ii) the filter cake, whereby a clear effluent, substantially free of particulates having particle sizes in the range of from about 0.1 to about 30 micrometers or higher is obtained and the useful life of the surface filter is extended. As noted above, the filter life is extended in comparison with conventional cartridge filtration technology and a much cleaner effluent filtrate is obtained. The combination of these two characteristics of the process of this invention make it extremely desirable in commercial oil and gas well treating operations: the extended filter life because of longer onstream time, the cleaner effluent filtrate because of improved productivity of the well. Additionally, the enhanced capability of the filter cake to remove particulates smaller than the absolute pore rating of the surface filter, e.g., in the case where a 30 micrometer absolute pore rating filter is used, particles of 0.1 micrometer are removed after a filter cake has been formed, that is, particles as small as 1/300 of the surface filter pore size, while maintaining a filter cake with the requisite porosity to avoid high pressure drops during onstream life, e.g., 50 pounds per square inch or higher, make the process of the subject invention highly desirable for the filtration of oil or gas completion fluids.

The subject invention will be better understood by reference to the drawings. The treatment system shown in schematic form in FIG. 1 is adapted for use with well completion fluids of the aqueous sodium chloride brine type. It utilizes a conventional pretreatment equipment for removal of particles larger than about 30 micrometers, including a shaker screen designated SS in the drawing, and two centrifugal separators designated CS in the drawing, which may operate independently with one being onstream while the other is down for cleaning, albeit they may be operated simultaneously in parallel. The shaker screen SS and the onstream centrifugal separator CS combine to remove substantially all particles greater in size than about 30 micrometers and to preferably reduce the influent loading in the oil or gas well treatment fluid to a level of from about 1,000 to about 2,000 parts per million of solid particulates in the particle size range of from about 0.1 to about 30 micrometers. The filter system generally designated F in FIG. 1 utilizes two filters operating in series, i.e., a prefilter stage and a final filter stage, to remove substantially all solid particulates having particle sizes in the range of from about 0.1 to about 30 micrometers. The two prefilters designated 1A and 1B in FIG. 1 are set up in parallel so that while one is being serviced, the other is onstream. In series with the particular prefilter 1A or 1B in operation at any given time is a final filter designated 2. Final filter 2 does not require a second spare in parallel, as is preferably the case with the two prefilters, 1A and 1B, since the need for servicing the final filter 2 is typically only once for every 20 to 30 servicings of the prefilters. The prefilters 1A and 1B and the final filter 2 are all preferably comprised of one or more elongated tubular filter cartridges containing pleated surface filter media. Where a number of cartridges is required to maintain flow densities within the required range, the preferred filter assembly for practicing the process of this invention is that disclosed in the copending Miller and Reed application, U.S. Ser. No. 406,095, the disclosure of which is incorporated herein by reference.

The total flow rate through the prefilter 1A or 1B and the final filter 2 is controlled downstream of filter 2 by a flow control valve 30. The flow density in gallons per square minute per square foot of filter surface area for each stage will, of course, be a function of the total flow rate in gallons per minute and the total filter surface area in each stage.

As disclosed in FIG. 1, an oil or gas well treatment fluid such as a completion fluid containing a high level of suspended solid particulates enters the shaker screen SS where a portion of the solid particulates are removed and then flows to the online centrifugal separator CS where additional solids may be removed. The treatment fluid, with a solid particulates loading in the range of about 2,000 ppm or less and which particulates are comprised primarily of solid particulates having particle sizes in the range of from about 0.1 to about 30 micrometers, then enters the filter system F via the inlet line 12, then proceeding via either line 13 or 14 to either prefilter 1A or 1B respectively. Flow through line 13 to prefilter 1A is controlled by on-off valves 15 and 16, and flow through line 14 to prefilter 1B is controlled by on-off valves 17 and 18. Since only one prefilter will be onstream at any given time, the on-off valves in one of the lines 13 or 14 are closed while the on-off valves in the other line are open.

On-off valves 22 and 23 are used to drain the fluid from the prefilters 1A and 1B during servicing, if desired. This is not necessary, however, if the filter assembly is constructed as disclosed in the Miller and Reed application, U.S. Ser. No. 406,095, referred to above.

Filtrate from either prefilter 1A or 1B proceeds via line 25 to the final filter 2. The differential pressure indicator 8A across the prefilters 1A and 1B taps the line 13 or 14 upstream of prefilter 1A or 1B and the downstream line 25 and provides a measure of the pressure drop across the onstream prefilter. Thus, the indicator shows when the pressure drop is so high that filter servicing is required. When the pressure drop across the online prefilter reaches a predetermined value, the flow of well treatment fluid to the prefilters is switched to the alternate prefilter, e.g., prefilter 1B, and prefilter 1A is taken off line for service or replacement of the filter cartridge assembly. Typically, a pressure differential across the filter or filter assembly of about 50 psi will be used to signal a shutdown.

Similarly, differential pressure indicator 8B provides a measure of the pressure drop across the final filter 2 by tapping the inlet line 26 and the outlet filtrate line 27, thereby indicating when the pressure drop has reached a level where the final filter assembly 2 requires servicing or replacement.

The flow control valve 30 (flow controller) controls the effluent filtrate flow in line 27 from the final filter 2 and, accordingly, effluent filtrate flow in line 25 from either prefilter 1A or 1B. The flow control valve 30 thereby maintains the flow densities across the prefilter and the final filter within the required limits of from 0.05 to 0.5 gallons per minute per square foot of surface area for each of the filters.

The turbidity meter 31 indicates the effluent turbidity in line 27 and, accordingly, the solids loading of the effluent. The flow density is adjusted as required to provide the desired filter life. Within the flow density range of from about 0.05 to about 0.5 gallons per minute per square foot of filter surface, the effluent quality is substantially independent of flow density. However, by reducing the flow rate within the specified range, the life of the filters can be extended.

Figure 2:
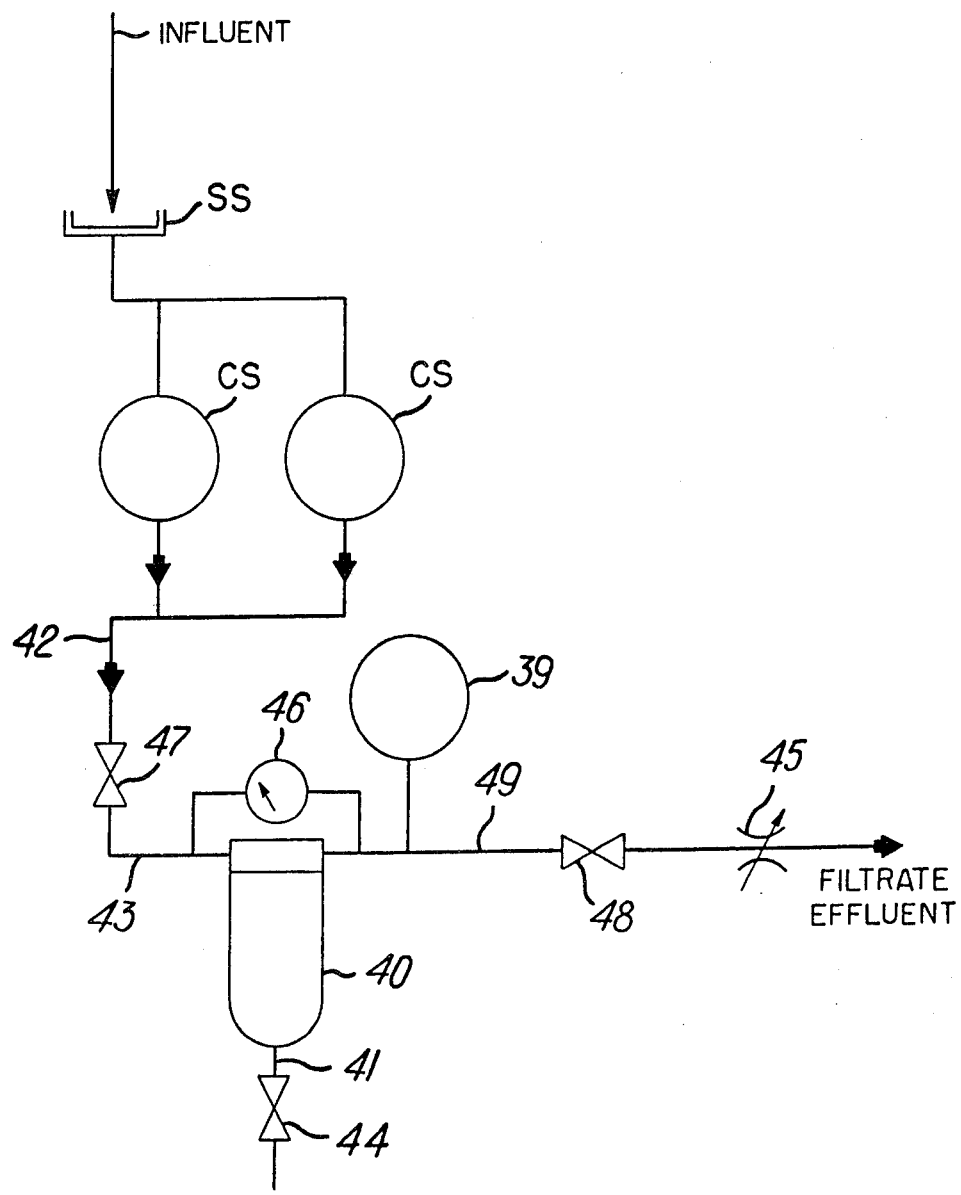
FIG. 2 is a flow sheet showing in schematic form an alternative treatment system useful for practicing the process of the subject invention and the flow path followed by the oil or gas well treatment fluid as it is filtered using the process of the subject invention. The treatment system shown includes the following equipment: upstream, coarse particle removal equipment, i.e., a shaker screen and a centrifugal separator, followed by a filter system comprised of a single filter stage.

Treatment fluid reservoirs are preferably used at both ends of the system described in FIG. 1 as well as at both ends of the system described in FIG. 2. That is, because the demands for clear treatment fluid may vary and the rate of return or recycle to the treatment systems shown in FIGS. 1 and 2 may in like manner vary due to, e.g., lost fluid downhole, a reservoir or surge tank is used at the front end to accomodate variations in return flow rates. Similarly, the reservoir upstream of the first filter can be used for makeup fluid and to provide a reservoir for calls on the system in excess of the treatment system's output capability.

The total effluent volume filtered per unit area of filter can be related to the flow rate or flow density of the influent treatment fluid by the following equation:

$$\text{Total Effluent Volume Filtered (To Plugging) Per Square Foot Of Filter Surface} = \frac{k}{\text{Influent Suspension Flow Density}}$$

where the total effluent volume filtered per square foot of filter surface is measured in gallons per square foot of filter surface, influent suspension flow density is measured in gallons per minute per square foot of filter surface, and k is a constant.

In accordance with the above relationship, for a given filter medium of a given surface area, as the fluid flow density for an influent or treatment fluid having a constant solids loading decreases, the total effluent flow volume to plugging increases. If the influent flow density is maintained within the required range of from about 0.05 to about 0.5 gallons per minute per square foot of surface area of the filter, an acceptable total effluent flow volume will be obtained with an acceptable filter life before plugging or blockage of the filter results from a build-up of a filter cake too thick and dense to permit flow through at an acceptable pressure drop.

The treatment system shown in FIG. 2 is similar to that of FIG. 1 but a one stage surface filter system is used, preferably of the type described in the copending Miller and Reed application, U.S. Ser. No. 406,095. As in FIG. 1, the filter system of FIG. 2 is preceded by a shaker screen designated SS and a pair of centrifugal separators designated CS. In the system of FIG. 2, however, no prefilter is employed.

As shown in FIG. 2, influent treatment fluid passes through the shaker screen and then through the on-line centrifugal separator, following which it enters the filter system via the inlet line 42. It then proceeds via line 43 to the filter 40. Flow through line 43 to filter 40 is controlled by on-off valves 47 and 48.

Drain line 41 is provided, controlled by on-off valve 44 to drain fluid from the filter during servicing if desired. As with the filter system disclosed in FIG. 1, if the preferred assembly disclosed in the copending Miller and Reed application, U.S. Ser. No. 406,095, is used, drain line 41 is not required.

Influent treatment fluid flows via line 43 into filter 40 and then out of the filter 40 via line 49. The differential pressure indicator 46 across filter 40 taps the lines 43 and 49 and provides a measure of the pressure drop across the filter, thus indicating the point at which servicing or replacement of the filter is required, i.e., the point at which loading of the filter reaches the point that the pressure drop across the filter is unacceptable.

Flow control valve 45 controls effluent flow from the filter 40, thus controlling the flow density of the influent treatment fluid within the required range of from about 0.05 to about 0.5 gallons per minute per square foot of filter surface.

The turbidity meter 39 measures the effluent turbidity and, accordingly, the solids loading of the effluent. This measurement is used to monitor the level of performance of the filter.

Filters Useful In The Subject Invention

Filters useful in the subject invention are those which can be characterized as surface filters. This type filter, as contrasted with depth filters, functions by trapping particulates primarily on the surface of the filter and not within the body of the filter. Dirt capacity and filtration capability of such a filter is provided by the filter cake. By contrast, depth filters, typically comprising a wound body of filamentary material in cylindrical form with a hollow core operate by providing a body of filtering material which provides tortuous paths for the fluid being filtered and traps particulate material at various points along those tortuous paths, that is, within the depths of the filter medium, giving rise to the conventional descriptive name depth filter, i.e., such filters provide dirt capacity by retaining dirt within the body of the filter medium. When filtering materials, such as those encountered in an oil or gas well treatment fluid, depth filters typically trap the particulate solids in about the first quarter or half-inch of a conventional cylindrical depth filter having an outside diameter of about 3 inches.

Surface filters used in the subject invention are relatively thin, sheet or membrane-like materials. They are preferably formed into pleated form and used in the form of filter cartridges of the type known in the filtration industry. In the process of this invention, the surface filter traps the solid particulates primarily on the upstream surface of the surface filter and then builds a filter cake which forms a part of the composite filter, i.e., a combination of the filter cake and the surface filter, and provides an effective filtering system for removal of particles as fine as about 0.1 micrometer, even with surface filters which themselves have substantially larger absolute pore ratings.

The manner in which this filter cake is formed is critical to the successful operation of the process of this invention. It has been discovered that the solid particulates found in well treatment fluids, i.e., drilling and formation debris as defined above, forms a filter cake with the necessary properties of pore size and density, providing the requisite permeability and life, when the filter system is operated within the flow densities specified herein, namely from about 0.05 to about 0.5 gallons per minute per square foot of filter surface. Surface filters useful in the subject invention do not necessarily, indeed, preferably do not, have absolute pore ratings as fine as the finest particles sought to be removed by the process of this invention, namely about 0.1 micrometer. Accordingly, when the surface filters of the subject invention are first put on stream, the process of the subject invention will not immediately provide an effluent substantially free of solid particulates in the range of 0.1 to 30 micrometers, as the term "substantially free" is defined above. However, relatively rapidly, the filter cake is built up as the contaminated treatment fluid passes through the surface filter and the system begins discharging a filtrate effluent of the desired quality.

If the oil or gas well treatment operation must, from the onset of the filtering process, be substantially free of solid particulates, the subject process should be carried out with a downstream final filter of an appropriate absolute pore rating to preclude passage of solid particulates of a size greater than can be tolerated by the particular treatment operation. In general, then, the downstream or final filter will have a finer absolute pore rating than the upstream or prefilter. The final filter is most desirably a surface filter, as is required for the prefilter or for a single stage filter. Preferably, it is also operated at a flow density of from about 0.05 to about 0.5 per square foot of filter surface area. However, because of the lower load placed on the final filter, it may be operated at relatively higher flow densities, e.g., a prefilter flow density of 0.3 gallons per minute per square foot of filter surface or less is preferred; a final filter flow density as high as 0.5 gallons per minute per square foot or even higher may be satisfactory because of the reduced load on the final filter.

The size of this downstream final filter, i.e., the total number of square feet of filter used and the flow density, are preferably tailored to be within the range of that specified for the prefilters, that is, within the range of from 0.05 to 0.5 gallons per minute per square foot of final filter surface. However, as indicated above, since the loading of this downstream is relatively low, particularly after the filter cake has built up on the prefilter, this filter has a useful onstream life of several times, e.g., 20 to 30 times, the life of the prefilter. Accordingly, the downstream final filter can be operated at higher flow densities than the prefilter, albeit still preferably within the range of about 0.05 to about 0.5 gallons per minute per square foot of filter surface.

The filter media useful as the surface filters, i.e., for the prefilter and the final filter where a two or more stage filter system is used or for the filter in a single stage system, include a wide variety of porous sheet material having pores connected from surface to surface. One or several sheets of the same or varying porosity may be employed. Sheets, such as open weave, wire or plastic mesh of the appropriate absolute pore rating, may be used. Paper sheets, which can, if desired, be resin impregnated, are a preferred base material since they provide an effective, versatile and inexpensive fluid-permeable filter medium. Resin impregnated cellulose based paper sheets are the preferred filter medium for the prefilter. Synthetic resin fibers may be formed into fibrous sheet form and used, including, by way of example, various polymeric materials such as fibers of polyvinyl chloride, polyolefins, such as polyethylene and polypropylene, polyvinyl chloride, polyesters and polyamides. Additionally, the filter medium useful in this invention can be prepared from a wide variety of other materials including glass, potassium titanate, mineral wool and the like. Rubber, casein, hemp, jute, linen, cotton, silk, wool, and mohair may also be used. Fibrous materials as described above may be formed into sheet materials as woven or nonwoven fibrous layers, such as belts, mats and bats. Woven wire mesh may also be used.

The filter in a single stage filter system and the prefilter in a two stage filter system should have an absolute pore rating in the range of from about 0.1 to about 40 micrometers, preferably from about 0.5 to about 30 micrometers, more preferably from about 5 to about 15 micrometers, and most preferably, about 10 micrometers. The downstream or final filter should preferably have an absolute pore rating in the range of from about 0.1 to about 20 micrometers, more preferably from 0.5 to 10, and most preferably about 2 micrometers or less.

Preferably, the surface filters used in this invention are as thin as practical to allow pleating and use in conventional filter cartridge elements. The thinner the material, the larger the number of pleats available and the higher the surface area that can be obtained for a given size cartridge. The sheet material used as the filter in the subject process may, in some cases, be sufficiently rigid to be self-supporting when formed in cylindrical form. However, if it is not, it may be supported by other more porous materials together with a porous core and/or a porous external sheet of rigid material such as polypropylene or the like, used as a support.

In filter assemblies useful in the subject invention, the filter media is preferably used in a tubular pleated form, preferably encased in a conventional cartridge cage, such as a conventional polypropylene cartridge cage having a rigid porous core, a porous external sheath and end caps to provide the necessary support and means for securing the filter cartridge in an appropriate housing or for securing one or more filter cartridges to each other in an end-to-end relationship as disclosed in the copending Miller and Reed application, U.S. Ser. No. 406,095. A preferred cartridge element for use as a prefilter in the subject invention is prepared from a resin impregnated, cellulose paper sheet material of the appropriate absolute pore rating formed into a tubular pleated form and supported in a conventional polypropylene cartridge cage as described above. When a prefilter assembly comprised of a multiplicity of such filter cartridges is used in a two stage filter system to practice the subject invention, the prefilter preferably has an absolute pore rating of about 10 micrometers and each cartridge of conventional size has an available filter surface of about 5.5 square feet. Similarly, the final filter is preferably comprised of a multiplicity of conventional cartridge elements comprised of glass fiber based filter sheet formed into a tubular pleated form and having an available filter surface area of about 5.5 square feet per cartridge.

When a single stage filter system is used, the preferred filter medium is a glass fiber based filter sheet having an absolute pore rating of about 10 micrometers.

The filter sheet material from which the filter elements of this invention are made can, if desired, be impregnated with a synthetic resin or cellulose derivative to increase its strength and resistance to wear by the fluid being filtered. The impregnating agent can be selected from a wide variety of materials, such as phenol-formaldehyde resins, urea-formaldehyde resins, melamine-formaldehyde resins, polyester resins, polyepoxide resins and the like. These type materials are well known in the paper and textile arts.

The end caps capping the cylindrical filter sheet can be of any desired material, such as metal or plastic. Preferably, they are relatively rigid and attached to the cylindrical filter sheet in a leak tight seal.

A wide variety of materials can be used to form the end caps, the porous core and the porous external sheath. Such cartridge elements are known and the design and manufacture are well within the purview of those skilled in the art. Representative useful materials for making the porous cores, porous external sheath and end caps (referred to hereinafter as "support elements" for the filter cartridge) include stainless steel, aluminum, copper, magnesium, titanium, nickel, iron and various alloys thereof. Additionally, the support elements can be formed of various synthetic polymeric material. Polypropylene is a preferred material. Cores made of polypropylene and other polymeric can be prepared by molding from powders or by stamping or shaping sheets of material. A variety of core designs may be used. A suitable core for use in the subject invention is described in U.S. Pat. No. 3,246,766, the disclosure of which is incorporated herein by reference.

The following examples illustrate the process of the subject invention. In the examples, as well as throughout the subject specification, all parts and percentages are by weight unless otherwise specified.

EXAMPLE 1

A series of experiments in the filtration of a well completion fluid were carried out on an 80-slot drilling platform located offshore in 200 feet of water. The objective was to recirculate the completion fluid, a 5 percent aqueous sodium chloride brine solution, with the maximum particle size of suspended solid particulate material in the filtrate below 1 micrometer and at a total solids loading of less than 1 part per million. The cleaning system employed in series, a 200 mesh shaker screen followed by 2 centrifuges. Flow through capacity of the system was 4 barrels per minute (168 gallons per minute). During a typical completion operation, from 10,000 to 15,000 barrels of completion fluid may be pumped into the well, the major portion during the perforation wash. An even larger quantity of completion fluid may be required if brine is lost to the formation.

Testing was carried out using a slip stream taken off of the flow out of the centrifuge (ahead of the conventional depth filter system) using the filter shown in FIG. 2 and with treatment fluid reservoirs at both ends of the system. A single 10 inch surface filter cartridge comprised of a glass fiber paper filter medium in pleated form with the corrugations 0.050 inches thick and 0.410 inches in depth having a total surface area of 6.5 square feet and having an absolute pore rating of 3 micrometers was used. A small portion of the fluid downstream of the centrifuge was passed through the single test filter cartridge while the major portion of the fluid passed through the conventional depth filter system. A second slip stream test was run, also using a single 10 inch cartridge of the same type of surface filter medium but with an absolute removal rating of 2 micrometers absolute. Both these tests used the general flow scheme shown in FIG. 2.

Performance was evaluated by sampling the effluent (1) downstream of the shaker screen, (2) downstream of centrifuges, (3) downstream of the filter array in the conventional depth filter system, and (4) downstream of the single cartridge filter used in the slip stream tests operated in accordance with the process of the subject invention. With the process of the subject invention, the flow rate through the single filter cartridge used in each of the slip stream tests was 0.7 gallons per minute per cartridge measured by a flow meter downstream of the filter cartridge, as shown in FIG. 2, i.e., a flow density of 0.1 gallons per minute per square foot of filter surface.

Solids content was measured by filtering known volumes of the sampled fluids onto fine pored nylon membrane discs, and the amount collected determined by gravimetric analysis.

Influent and effluent percent solids were also measured by calibrating a portable turbidity meter, Model No. DRT-15 available from Fisher Scientific Company, by gravimetric analysis measurements. This enabled an onsight measurement of solids throughout the testing at an accuracy of about plus or minus 50 percent at loadings of 10 parts per million or higher. For comparative purposes, i.e., for measuring changes of turbidity from one sample to another, the turbidity measurements were accurate to within about plus or minus 10 percent.

Particle size distribution discs were also prepared at the test site by filtering the test effluent through them. Particle density on the shaker screen was assessed on site; actual particle counting was also carried out off site.

With the system operating according to the prior art as a control, i.e., with the shaker screen, a centrifuge and a conventional filter system comprised of about 100 standard 10 inch polypropylene depth filter cartridges, and with an influent well completion fluid having a loading of from about 1,500 to about 2,000 parts per million solid material of particles in the range of from about 0.1 to about 30 micrometers, the effluent solids of the conventional filter system (determined by turbidity measurements) were 900 parts per million.

When the influent turbidity to the conventional filter system was reduced to 180 parts per million solids (124 nephelos turbidity units, NTU), the turbidity of the effluent off of the conventional polypropylene depth filter system was measured at 85 parts per million (80 NTU).

In one series of runs, downstream of the shaker screen and upstream of the centrifuges, the completion fluid was found to contain 1,683 parts per million solids. Downstream of the centrifuge, the fluid contained 1,681 parts per million solids, indicating that the centrifuge was virtually ineffective due to the small particle size of the solids material and its well dispersed condition in the fluid.

In another series of runs, the completion fluid upstream of the shaker screen had an influent solids content of 115,633 parts per million. Downstream of the centrifuge in operation at that time, the fluid contained 2,040 parts per million solids.

Analysis of the centrifuge effluent for particle distribution showed that, for particles above 1 micrometer in size, approximately 70 percent of the particles were in the range of between 1 and 5 micrometers, 20 percent were between 1 and 15 micrometers, and less than 4 percent were over 25 micrometers.

The slip stream tests carried out in accordance with the process of the subject invention at a flow density of 0.1 gallons per minute per square foot of filter surface and using a single filter cartridge (2 micrometers absolute pore rating, Series A, and 3 micrometers absolute pore rating, Series B), gave the results set out in Table 1 below.

TABLE 1

Series A (using a U2-20 filter with an absolute pore rating of 2 micrometers)

| Elapsed Run Time (mins.) | | Results |
|---|---|---|
| 5 | Influent turbidity | = 1500 ppm[1] |
| | Influent gravimetric solids | = 967 ppm |
| | Effluent particle size distribution | = 53 particles per ml between 1-2 micrometers and none larger |
| 22-49 | Influent turbidities | = 3 measurements at 300, 270, 330 ppm[1] |
| 60 | Effluent Turbidity[2] | = 0.6 ppm[1] |
| 69 | Cartridge plugged | = pressure reached 70 psi; major increase in last 10 minutes |

[1] Estimated from turbidimeter calibration curve
[2] Effluent fluid has same visual clarity throughout the run Series B (using a U0-30 filter with an absolute pore rating of 3 micrometers)

| Elapsed Run Time (min.) | | Results |
|---|---|---|
| 2 | Influent turbidity[1] | = 470 ppm |
| | Effluent turbidity | = 11 ppm |
| 17 | Influent turbidity | = 40 ppm |
| | Effluent turbidity | = 4 ppm |
| 22 | Influent turbidity (after 2 hour shutdown) | = 280 ppm |
| | Effluent turbidity | = 1 ppm |
| 40 | Influent turbidity | = 1840 ppm |
| | Effluent turbidity | = 5 ppm |
| 45[2] | Effluent particle size distribution | = 93 particles/ml of 1-5 micrometers in size |

[1] All ppm in Series B were estimated from turbidmeter calibration curve
[2] Test terminated at Δ P of 5 psi It is apparent from these results that after an initial period while a filter cake was forming, the effluent brine contained 5 or less ppm solids at influent loadings ranging from about 40 to as high as about 1,840 ppm, using a single filter cartridge in a single stage without prefilters. Using either cartridge, the time to plugging represented an adequate onstream cartridge life, up to a differential pressure of 70 psi (Series A).

In Series A, the cartridge was onstream for an elapsed time of 69 minutes while during this time three cartridge changes were made in the system using conventional filtration. The influent solids ranged from about 300 ppm to about 1,500 ppm during this period. Effluent from the filter cartridge had a particle size of less than 2 micrometers and a solids loading below 1 ppm.

In Series B, the onstream elapsed time was 45 minutes during which time the influent solids ranged from about 500 ppm to about 1,800 ppm and the effluent had a particle size of up to 5 micrometers and a solids loading of 5 ppm or less. The Series B test was shut down at a ΔP of only 5 psi because of darkness. The results obtained indicated, however, that an extended filter life would have been obtained. Indeed, the 45 minute filter life obtained with a ΔP buildup of only 5 psi represented 2 cartridge changes of the conventional filtration system.

In the above experiments the flow density was 0.10 gpm per square foot. At this flow density the filter systems had acceptable useful lives before blockage.

EXAMPLE 2

A series of laboratory filtration tests were carried out on an aqueous 5 percent sodium chloride brine well completion fluid having a solids loading of particles in the range of from about 0.1 to about 30 micrometers of 500 parts per million, i.e., on the well completion fluid used in the off shore drilling platform of Example 1 sampled downstream of the centrifuges in the two stage filter system shown in FIG. 1 herein. The prefilter stage was comprised of 3 surface filter discs of epoxy resin impregnated cellulose paper filter medium having a nominal removal rating of 10 micrometers and an absolute pore size (removal rating) of 30 micrometers, followed in series by a final surface filter comprised of a disc of the glass filter media of Example 1 having an absolute pore size (removal rating) of 2 micrometers.

The completion fluid was circulated to the prefilter stage at a flow density of 0.13 gallons per minute per square foot of prefilter surface and to the final filter at a flow density of 0.39 gallons per minute per square foot of filter surface. After a period of 2 hours the filter cake on the prefilter had built up to a thickness of 0.027 inches, at which time a pressure differential of 39 psi across the prefilter was reached and the test was halted. No significant pressure buildup on the final filter was observed.

The average effluent downstream of the prefilter but before the final filter was analyzed for the amount of solids and found to be 130 parts per million during the first 10 minutes of operation. Ten minutes after start up at an influent solids loading of 500 parts per million to the prefilter, an effluent containing less than 1 part per million was produced downstream of the final filter. These results showed that, in this instance, a fined pored final filter was necessary during the initial operation (until the build up of a filter cake on the prefilter) to reduce the solids loading and obtain a clear effluent during the initial operation.

It should be noted that the effective pressure differential across the filter cartridge, which is the primary determinant of when a filter cartridge must be changed, provided that adequate filtering characterisitics are being maintained, may differ for a pleated cartridge as compared with a flat disc type filter of the same material since the volume between the pleats may become completely filled before the pressure differential across the thickness of the filter cake and the surface filter has reached a level that the differential pressure is unacceptable.

A determining factor in such a system then becomes the point at which the volume between the pleats of the filter is filled, thereby substantially reducing the surface area available for filtering. Accordingly, k values in the equation discussed above and which are also set out in FIG. 3 for a 2 micrometer glass filter, and which were determined on flat discs of filter sheet material, provide useful guidelines for determining the total effluent flow per square foot of filter surface which may be expected through a particular filter material before plugging occurs. However, the configuration of the filter material, e.g., a tubular pleated filter sheet, as preferably used to maximize filter surface for a given size filter assembly housing, vis-a-vis a flat disc of the same filter sheet, may result in a more limited onstream life than the subject equation would suggest. The equation effectively provides an upper limit on the total effluent which may be obtained per square foot of filter surface. In practice, change out of filters will principally be determined by the acceptable pressure drop across the filter and, of course, by the acceptable effluent solids loading which is determined by monitoring the solids loading in the effluent treatment fluid off of the filter.

With regard to the experiments carried out in Example 2, it was also determined that after the initial 10 minute start up of the prefilter an upset to the system, such as pressure surge from a pump stopping and restarting, would unload the prefilter for a 10 minute period before the effluent again came to equilibrium at a solids loading of less than 1 part per million. During this 10 minute period, the average effluent from the prefilter was 28 parts per million.

EXAMPLE 3

The following series of laboratory tests were conducted on aqueous 5 percent sodium chloride brine completion fluid containing 500 ppm of solid particulates in the range of from about 0.1 to about 30 micrometers from the well described in Example 1. A single filter stage was used with three separate tests carried out using, individually, specially prepared filter cartridges of the epoxy resin-impregnated paper surface prefilter type of Example 2, reduced in overall length to approximately one-quarter the standard length. The three filter cartridges had the following configurations:

| Element | Number of Corrugations or pleats | Pleat Depth in inches | Area ($ft^2$) (Allowing for resin wicking) | Area ($ft^2$) for 10 inch element |
|---|---|---|---|---|
| 1 | 89 | 0.410 | Not tested | 4.5 |
| 2 | 98 | 0.410 | 1.01 | 5.0 |
| 3 | 108 | 0.410 | 1.13 | 5.5 |

These runs were made using the system shown in FIG. 2 at the effluent flow density (k=3.2) noted in the Table below:

| Element | Element Cake Volume ($in^3$) | Effluent Flow Density ($gpm/ft^2$) | Time to Reach Plugging (40 psi) (minutes) |
|---|---|---|---|
| 1 | 8.4 | 0.16 | 93 (Calculated) |
| 2 | 7.8 | 0.105 | 99 |
| 3 | 7.0 | 0.13 | 78 |

This example shows that for a given filter medium in pleated form there is an optimum number of pleats. Generally, the more pleats the greater the surface area . . . a desirable attribute. However, if the number of pleats is too high, the volume of space between the pleats available for cake buildup is reduced . . . an undesirable characteristic. For this system, 98 pleats were better than either 89 or 108. Ideally, the filter should reach a ΔP at which shut-down would normally occur at the point where the volume between the pleats has just been filled.

EXAMPLE 4

The following laboratory test was conducted on a 5 percent aqueous sodium chloride brine completion fluid containing 500 parts per million of solid particulates in the range of from about 0.1 to about 30 micrometers from the well described in Example 1. The filter system was comprised of a single surface filter cartridge one-quarter the standard length of the type described in Example 3. The pleats were 0.625 inches in depth and there were 60 corrugations or pleats with a total surface area of 0.96 square feet. A standard length element of this type has about 5 square feet of surface area, which gives twice the cake volume of a 98 corrugations or pleats element with pleats having a depth of 0.410 inches. At a flow density of 0.138 gallons per minute per square foot of filter surface (k=3.2), 120 minutes was required before the pressure differential across the filter reached 40 psi, a value at which the filter would normally be changed out because of the high pressure differential.

This example shows that by going to a deeper pleat you can keep the total filter area high with a lower flow density and thereby increase the cake volume.

EXAMPLE 5

The following laboratory test was also conducted on a 5 percent aqueous sodium chloride brine completion fluid containing varying loadings ranging from 1,500 ppm to 100 ppm of solid particulates in the range of from about 0.1 to about 30 micrometers taken from the well of Example 1. In this case, a single surface filter stage comprised of a disc of the filter media of Example 1 (k=2.3) having an absolute pore rating of 2 micrometers and with a surface area of 0.015 square foot was used with a flow rate of 6 cubic centimeters per minute (corresponding to a flow rate of 0.11 gallons per minute per square foot of filter surface).

At 1,500 parts per million influent loading, the filter required 110 minutes to reach a pressure differential of 30 psi.

At 500 parts per million influent loading, 140 minutes were required to reach the same pressure differential, and at 100 parts per million influent loading, 170 minutes were required to reach a pressure differential of 32 psi.

In all of the tests the effluent was visually clear. This series of tests shows that as you drop the influent loading from a level of 1,500 to 100 the life of the filter was only increased from a time of 110 minutes to 170 minutes, indicating that the life expectancy of a disc type filter is not dependent on the loading of the disc filter.

Analysis of the data obtained from the experiments of the type exemplified above and, in particular, the study of the curves obtained by graphing pressure differential ΔP against time, representing the useful life of the filter, shows that for a given filter medium of a given filter medium surface area at a given influent loading, the total effluent flow volume through the filter over the useful life of the filter can be represented by the equation:

$$\text{Total Effluent Volume Filter (To Filter Plugging) Per Unit Area Of Filter} = \frac{k}{\text{Flow Density of Influent Treatment Fluid}}$$

The value of k in this equation has to be determined empirically, since it depends upon the type of fluid that is being filtered, the type of contaminant or loading that is present and removed by filtration and the proportion of contaminant loading in the influent. The empirical determination is made in accordance with the following standardized test:

Standardized Test

A sample of the filter medium to be employed in the filter system of the subject invention (in the form of a disc of known surface area, for example, 0.015 square feet) is placed in a test fixture and influent treatment fluid from the fluid stream to be filtered is taken from the final cleaning stage, i.e., downstream of the shaker screen or centrifuge or coarse filter, depending upon which of these systems is used upstream of the filter, and then passed through the filter disc. Flow density of the influent treatment fluid is maintained within the prescribed range of from 0.05 to 0.5 gallons per minute per square foot of surface area and the flow is continued with the total effluent flow being measured until the pressure differential across the filter disc reaches 30 psi when the test is stopped. From the effluent flow data, the flow density of the influent treatment fluid, the value of k is calculated using the equation set out below. Then using this value of k, the total volume of effluent flow which can be obtained or, alternatively, the total amount of treatment fluid which can be filtered at the specified influent treatment fluid flow density can be obtained. If a different filter medium is substituted or the loading of the influent treatment fluid changes, or other variations occur, it is necessary to rerun the standard test and recalculate k. Since the value of k is determined with a disc of the filter material and typically the cartridge filters used in the process of the subject invention are in pleated form, the determination to shut down and change out an array of cartridge filters may be determined by the build up of filter cake to a point where the volume between the pleats is full, at which point the surface area available in the pleated cartridge is substantially the external cylindrical surface area of the nominal external surface of the cylindrical filter, i.e., the surface area of the cylindrical filter has dropped from its initial high value to reflect simply the surface area present in a conventional depth filter. At this point the differential pressure across the filter will have increased substantially, calling for a shut down and change out of the cartridge filters. This may occur prior to the time that the above equation has equal values on the left and the right sides. Accordingly, the equation is useful as a general guideline for the upper limit on the total effluent volume which may be filtered but with a pleated filter the actual total volume may be less.

FIG. 3 is a plot of k values versus percent of particles (of total number present) less than 5 micrometers in size in the influent.

Types of Fluids Which May Be Filtered

The process of the subject invention may be used with a variety of oil and gas well treatment fluids. It has particular application with completion, stimulation and work over fluids of all types, particularly the aqueous based sodium chloride brines containing varying amounts of sodium chloride or the like ranging up to about 25 percent of the brine. Completion fluids based on mixtures of water and salt or water and immiscible solvents such as alcohols, polyoxyalkaline glycols and glycol ethers may also be treated by the process of the subject invention. While the invention has primary application to oil well completion fluids, it can also be used with oil and gas well treatment fluids such as well stimulation fluids used under pressure for fracturing strata such as alkaline and acidic aqueous fluids. In these cases, of course, the filter medium selected must have the capability of withstanding chemical attack by the particular treatment fluid.

As noted above, the level of loading of completion fluids as they emerge from an oil or gas well can be very heavy. The filter system of the subject invention is particularly designed for the removal of small particles of less than 30 micrometers in size, i.e., in diameter or across their largest dimension. Therefore, particles larger than this size should be removed before the liquid is introduced into the filter system by using conventional coarse particle removal equipment, such as shaker screens, centrifuges and coarse filters whose pore size is well in excess of 30 micrometers, for example, 50 to 100 micrometers or higher. When such large particle or coarse particle removal methods are applied, the influent treatment fluid fed to the filter system of the subject invention will not normally contain in excess of about 2,000 parts per million solids loading. The process of the subject invention can be used for any solids loading below 2,000 parts per million. Any incidental particles larger than 30 micrometers will also be removed.

In the filter system of the subject invention, both the surface filter and the filter cake built up on the upstream surface of the surface filter in the course of particle removal combine to act as a filter composite to remove particles below 30 micrometers in size. For this reason, the surface filter used in the subject invention need not have an absolute pore rating or absolute particle removal rating below 30 micrometers. As long as the average filter pore size or particle removal rating is of the same size or smaller than a portion of the particles present in the influent treatment fluid, a filter cake will be built up and, as the cake builds up, it adds its filtering function to that of the surface filter. Accordingly, the filtering process in the subject invention is the result of a filter composite formed of the surface filter and the filter cake.

The surface filter will, of course, remove all particles larger than its pore size ab initio, without the build up of the filter cake. Consequently finer pored surface filters are preferred in circumstances where absolutely no passage of particles smaller than the pore size of the filter can be tolerated, even in the initial stages of the filtration process. However, the finer the absolute pore rating of the surface filter used, in general the more expensive the filter will be. Accordingly, where higher initial loadings of the effluent can be tolerated, surface filters whose absolute pore ratings are larger than 30 micrometers may be used, since within the first few minutes, for instance after 10 minutes of operation, the filter cake will have built up to the point where smaller particles, of a size below the absolute pore rating of the filter, will also be removed by virtue of their filtration through the filter cake, and a relatively or substantially clear effluent is obtained, downstream of the filter. Where influent solids loading is not unduly high, for example, in excess of 1,000 parts per million, a single filter stage may suffice to produce clear effluent. It is, however, preferable, where effluent substantially free of particulates in the size range of from about 0.1 to about 30 micrometers or higher is required, to use two or more filter stages in series. The first stage will typically contain a coarser filter than the final filter stage, thereby allowing a portion of the finer particles to pass through the first filter and proceed downstream to the final filter, and thus build up a filter cake on both the prefilter or first filter stage and the final filter stage or stages. Passage of the filter through multiple filter composites in this way provides a higher initial level of clarity than a single pass through a single coarser filter.

Industrial Applicability

The process of the subject invention finds particular use in the treatment of oil and gas well treatment fluids, such as completion fluids, stimulation fluids, and work over fluids. It also may be used with the newer form of drilling fluids using high levels of brine but not with the conventional drilling muds containing large quantities of bentonite and the like. It has particular applicability for the removal of drilling and formation debris present in amounts up to 2,000 parts per million of solid particulates having a particle size in the range of from about 0.1 to about 30 micrometers.

We claim:

1. A filtering process for obtaining a clear filtrate effluent from a turbid oil or gas well treatment fluid contaminated with up to about 2,000 parts per million of solid particulates comprised of drilling and formation debris having particle sizes in the range of from about 0.1 to about 30 micrometers comprising passing said treatment fluid through a surface filter having an absolute pore rating of about 40 micrometers or less at a flow density of from about 0.05 to about 0.5 gallons per minute per square foot of filter surface such that (1) initially at least a portion of said particulates is collected on the upstream surface of said surface filter and begins forming a filter cake with enhanced capability for removing particulates smaller than the absolute pore rating of said surface filter and (2) thereafter said treatment fluid is filtered through a filter composite of (i) said surface filter and (ii) said filter cake, whereby a clear filtrate effluent substantially free of solid particulates having particle sizes in the range of from about 0.1 to about 30 micrometers or higher is obtained and the useful life of said surface filter is extended.

2. The process of claim 1 wherein said surface filter has an absolute pore rating in the range of from about 0.5 to about 30 micrometers.

3. The process of claim 2 wherein said clear filtrate effluent is substantially free of solid particulates having particle sizes in the range of from about 0.1 to about 30 micrometers or higher.

4. The process of claim 2 wherein said clear filtrate effluent contains no more than 2 ppm of solid particulates having particle sizes in the range of from about 0.1 to about 30 micrometers.

5. The process of claim 2 wherein said flow density is in the range of from about 0.05 to about 0.3 gallons per minute per square foot of filter surface.

6. The process of claim 2 wherein said treatment fluid is contaminated with up to about 1,000 parts per million of said solid particulates.

7. The process of claim 1 wherein said surface filter has an absolute pore rating in the range of from about 1 to about 15 micrometers.

8. The process of claim 1 wherein said surface filter has an absolute pore rating of about 10 micrometers.

9. The process of claim 1 wherein said surface filter comprises one or more filter cartridges comprised of a pleated filter sheet material in tubular form.

10. The process of claim 9 wherein said sheet material is a resin impregnated paper.

11. The process of claim 1 wherein said surface filter is a prefilter and the effluent therefrom is passed through a second filter having an absolute pore rating finer than that of said prefilter whereby from the initiation of the filtration process, the effluent from said second filter is substantially free of solid particulates larger than the absolute pore rating of said second filter.

12. The process of claim 11 wherein said second filter is a second surface filter and the flow density through said second filter is in the range of from about 0.05 to about 0.5 gallons per minute per square foot of filter surface area.

13. The process of claim 12 wherein said prefilter is comprised of one or more filter cartridges comprised of a resin impregnated paper filter sheet in pleated, tubular form and having an absolute pore rating of about 10 micrometers and said second filter is comprised of one or more filter cartridges comprised of a resin impregnated glass filter sheet in pleated, tubular form and having an absolute pore rating of about 2 micrometers.

14. The process of claim 11 wherein the flow rate through said prefilter is in the range of from about 0.05 to about 0.3 gallons per minute per square foot of filter surface area.

15. The process of any one of claims 1 to 14 wherein said treatment fluid is a completion fluid.

16. The process of any one of claims 1 to 14 wherein said treatment fluid is a stimulation fluid.

17. The process of any one of claims 1 to 14 wherein said treatment fluid is a brine based drilling fluid.

18. The process of any one of claims 1 to 14 wherein said treatment fluid is a work over fluid.

19. The process of any one of claims 1 to 14 wherein the solid particulate contaminants in said treatment fluid comprise bentonite clay.

20. A filtering process for obtaining a clear filtrate effluent from a turbid oil or gas well influent treatment fluid contaminated with up to about 2,000 parts per million of solid particulates comprised of drilling and formation debris having particle sizes in the range of from about 0.1 to about 30 micrometers comprised of (a) passing said treatment fluid through a filter system comprised of two or more filter stages, said first filter stage comprised of a surface filter having an absolute pore rating about 40 micrometers or less and operating at a flow density of from about 0.05 to about 0.5 gallons per minute per square foot of filter surface such that (1) initially at least a portion of said particulates is collected on the upstream surface of said surface filter of said first filter stage and begins forming a filter cake with enhanced capability for removing particulates smaller than the absolute pore rating of said surface filter and (2) thereafter said influent treatment fluid is filtered through a filter composite of (i) said surface filter and (ii) said filter cake, and (b) passing the effluent from said first filter stage through a second filter stage comprised of a filter having a finer absolute pore rating than said surface filter of said first filter stage whereby from the initiation of the filtration process, the effluent from said second filter stage is substantially free of solid particulates larger than the absolute pore rating of the filter of said second stage and after the formation of said filter cake on said upstream face of said surface filters of said first filter stage a clear effluent filtrate substantially free of particulates having particle sizes in the range of from about 0.1 to about 30 micrometers or higher is obtained and the useful life of said surface filter is extended.

* * * * *